Figure 1:
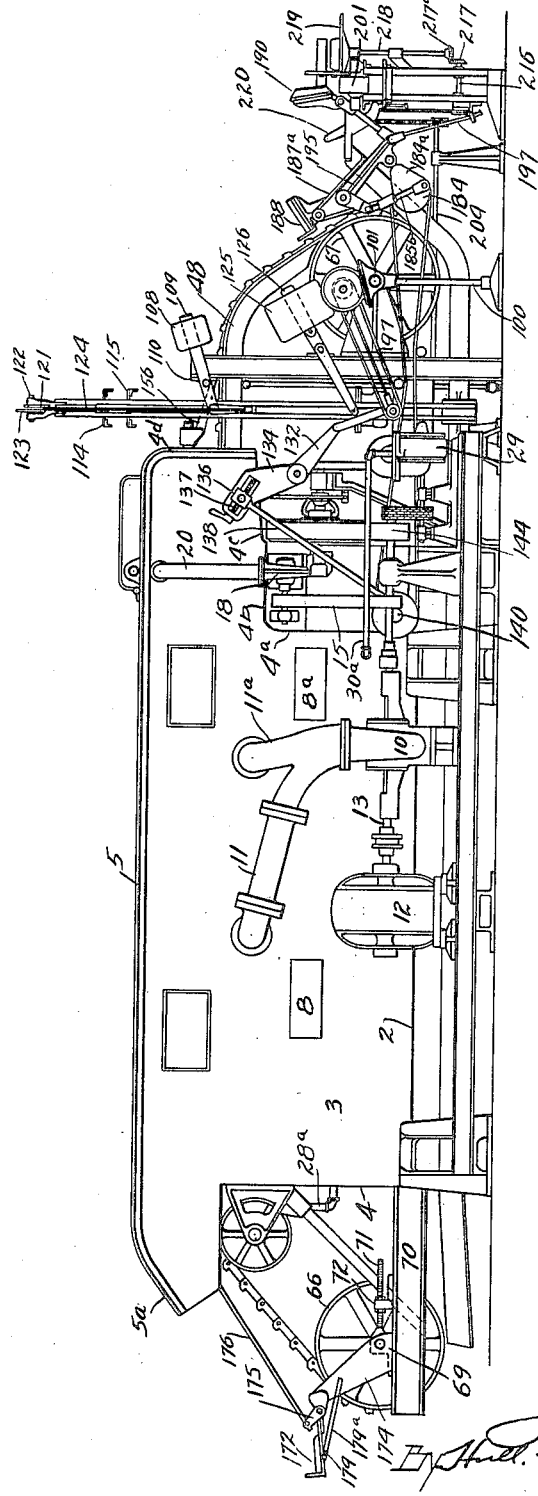

July 31, 1923.

C. H. LOEW ET AL

BOTTLE CLEANING APPARATUS

Filed March 17, 1917

1,463,763

12 Sheets-Sheet 1

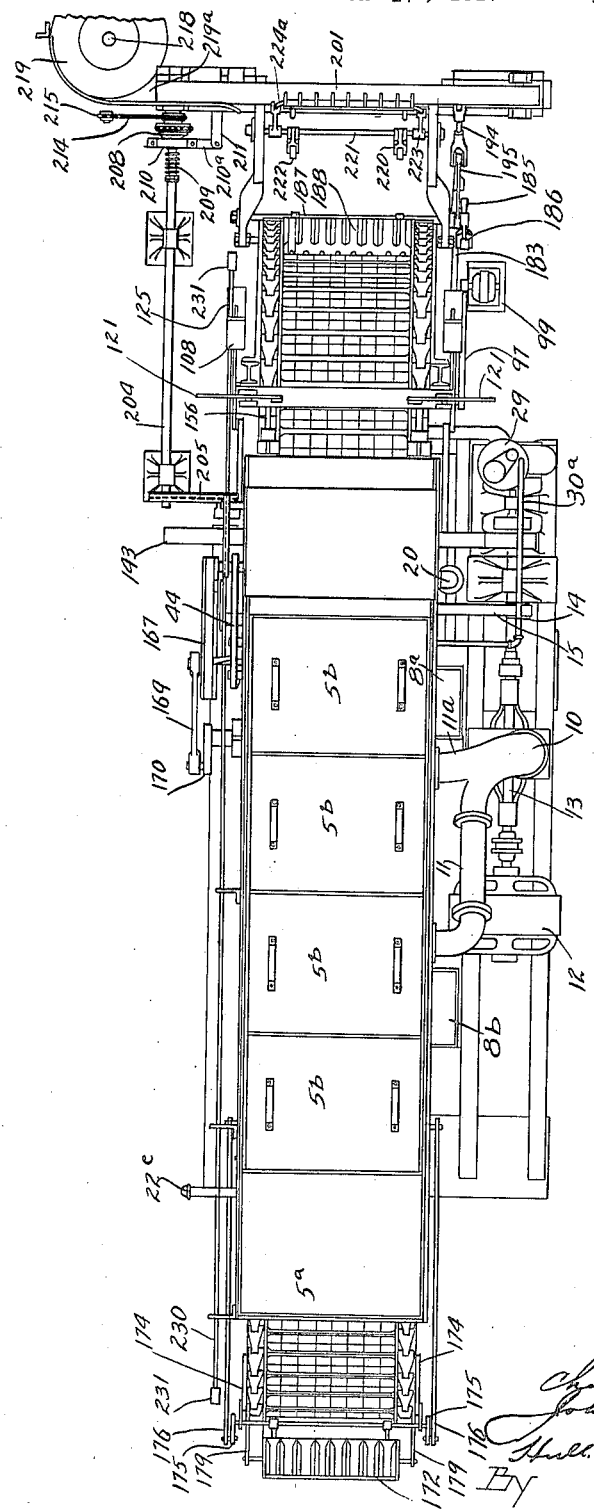

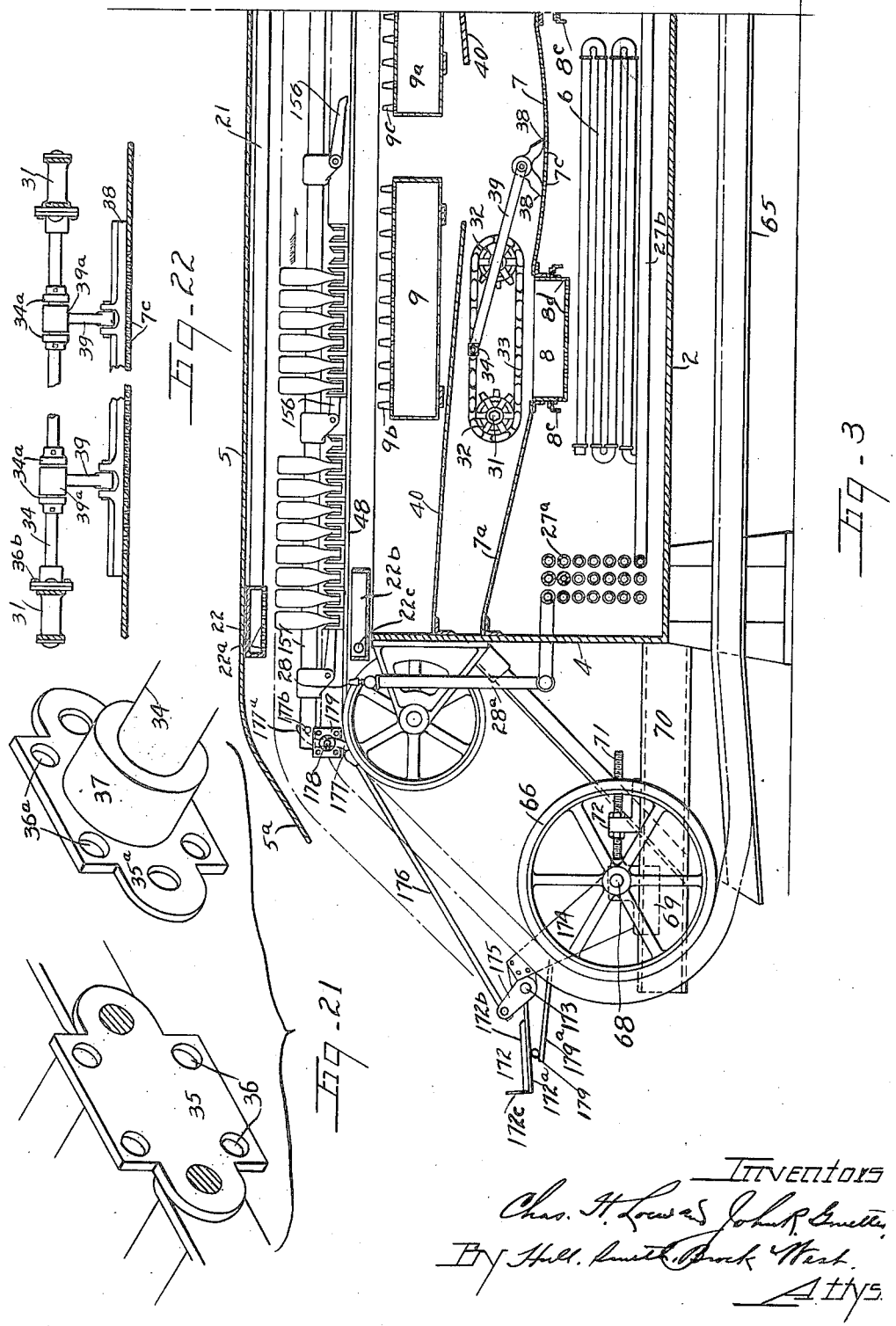

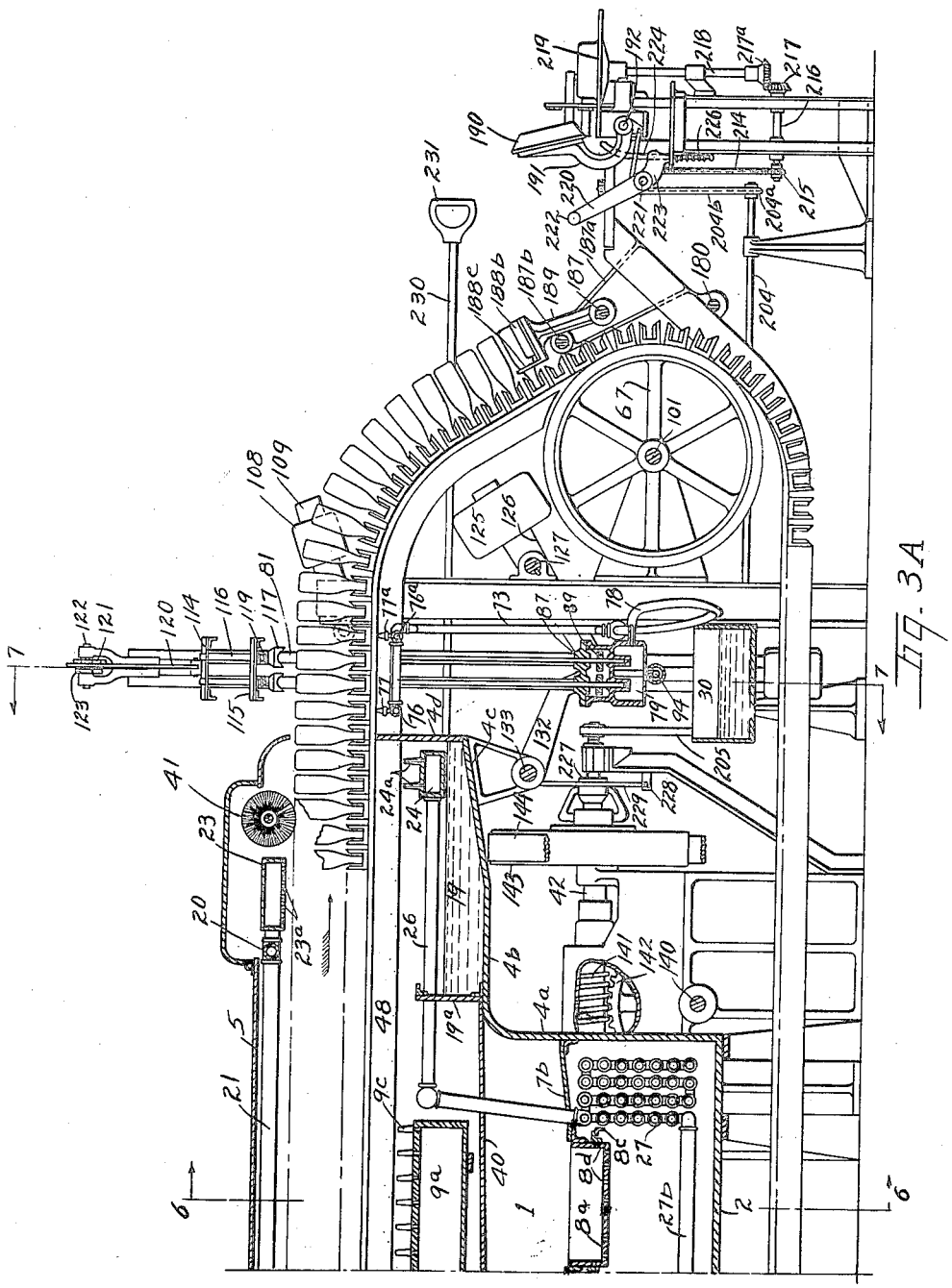

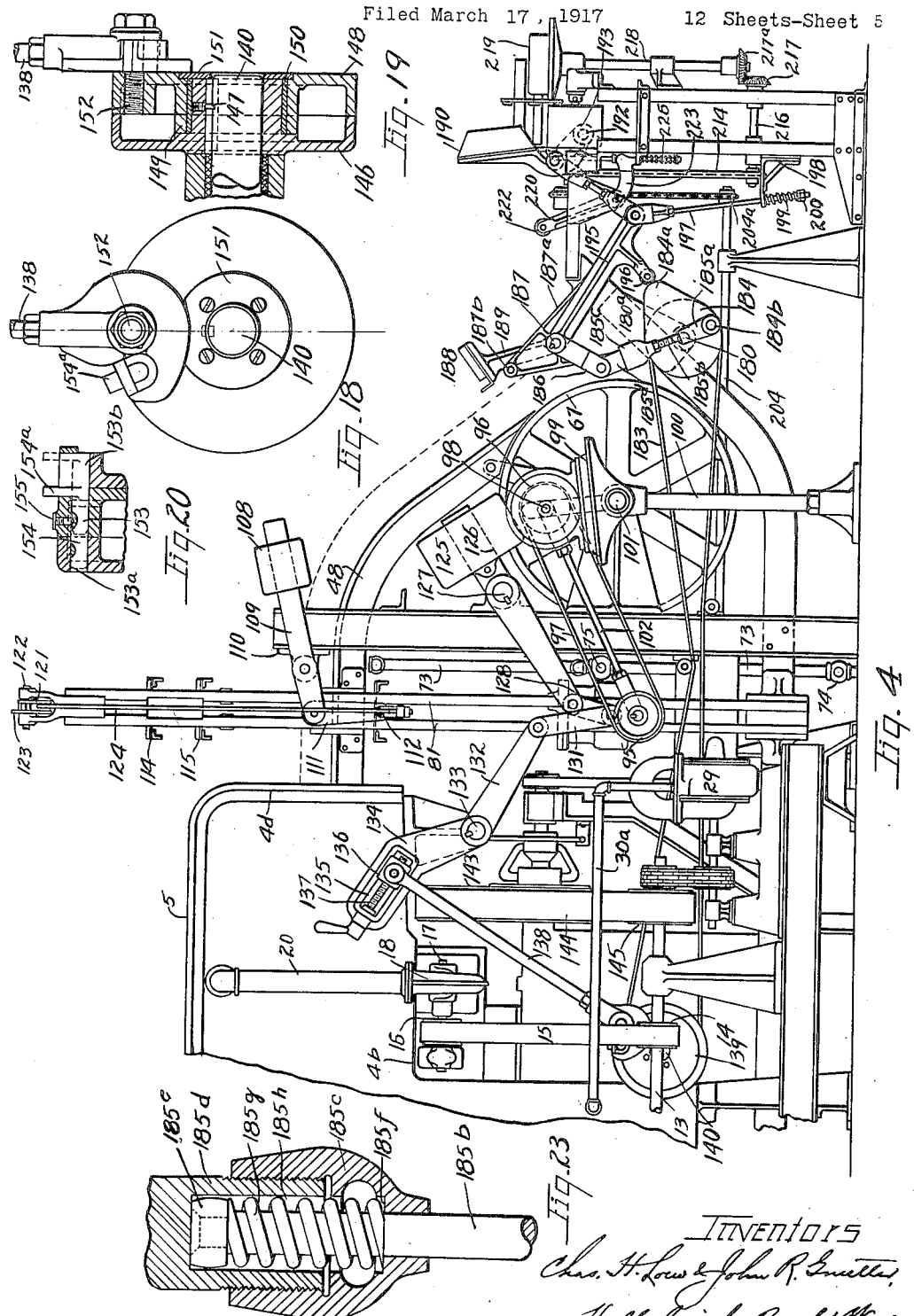

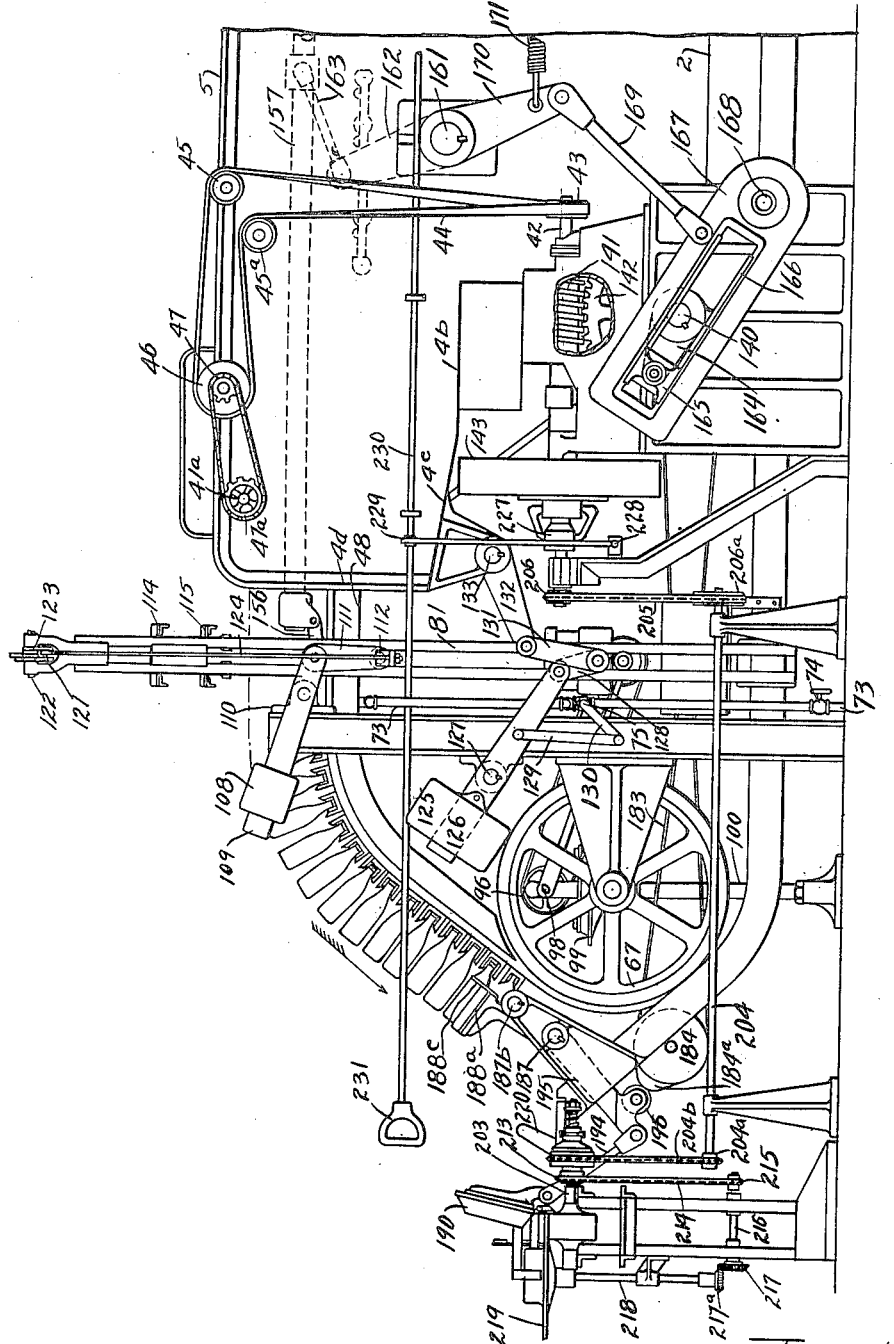

July 31, 1923.

C. H. LOEW ET AL 1,463,763

BOTTLE CLEANING APPARATUS

Filed March 17, 1917

12 Sheets-Sheet 7

Inventors
Chas. H. Loew & John R. Gnettes.
By Hull, Smith, Crook West.
Attys.

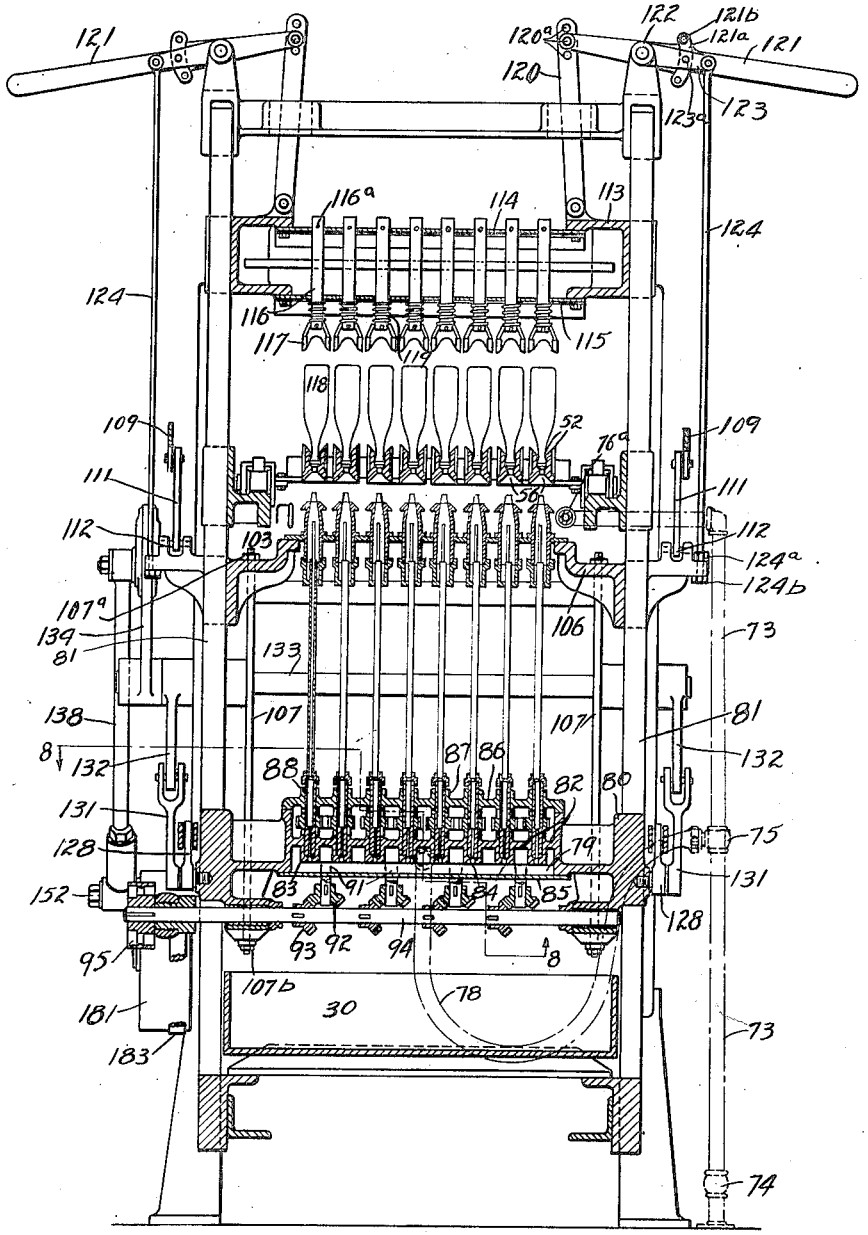

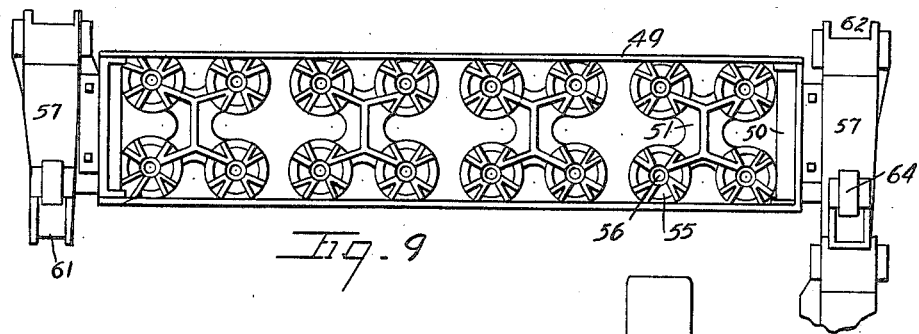
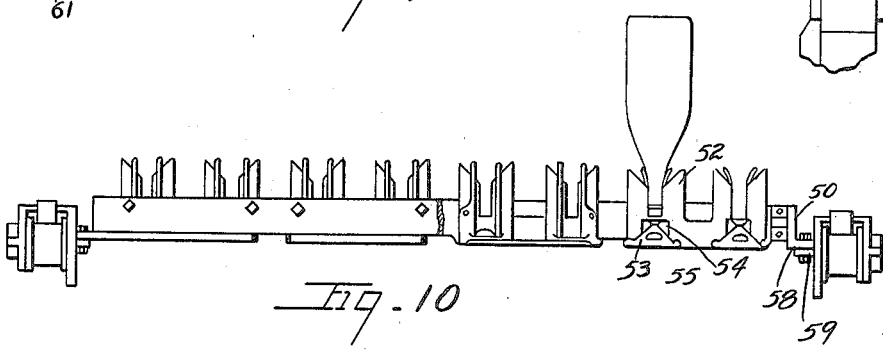
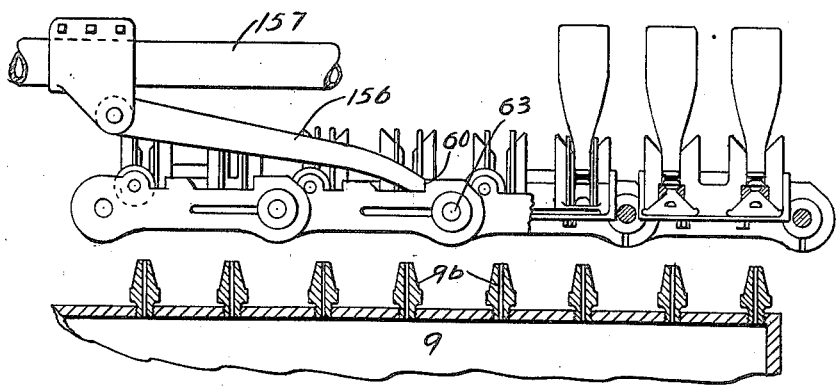

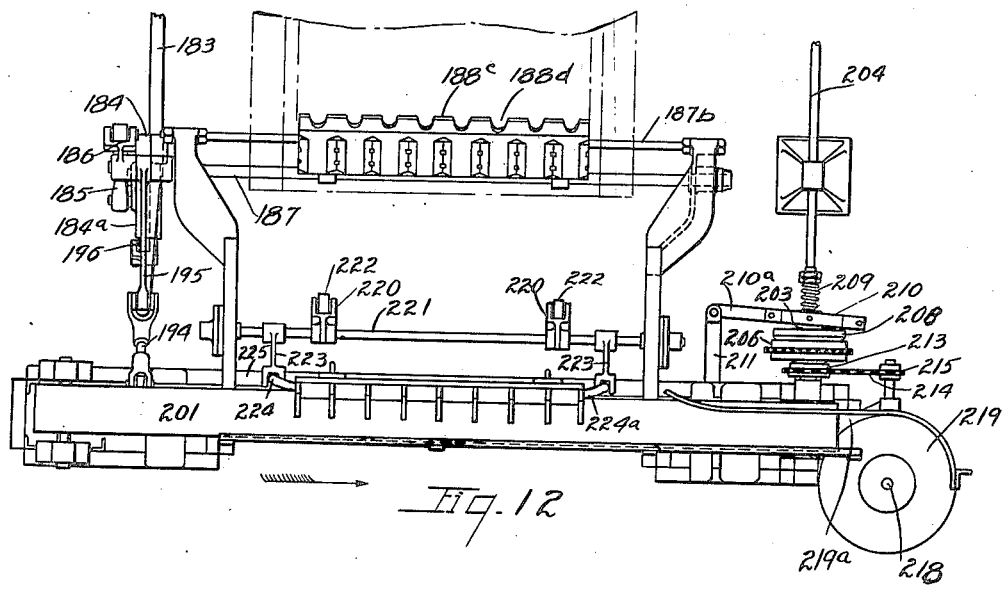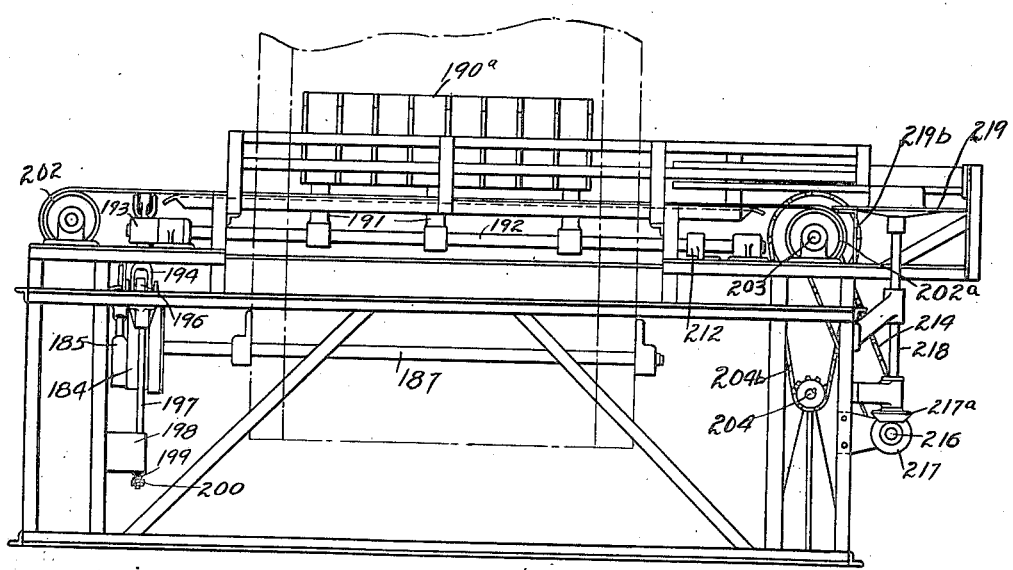

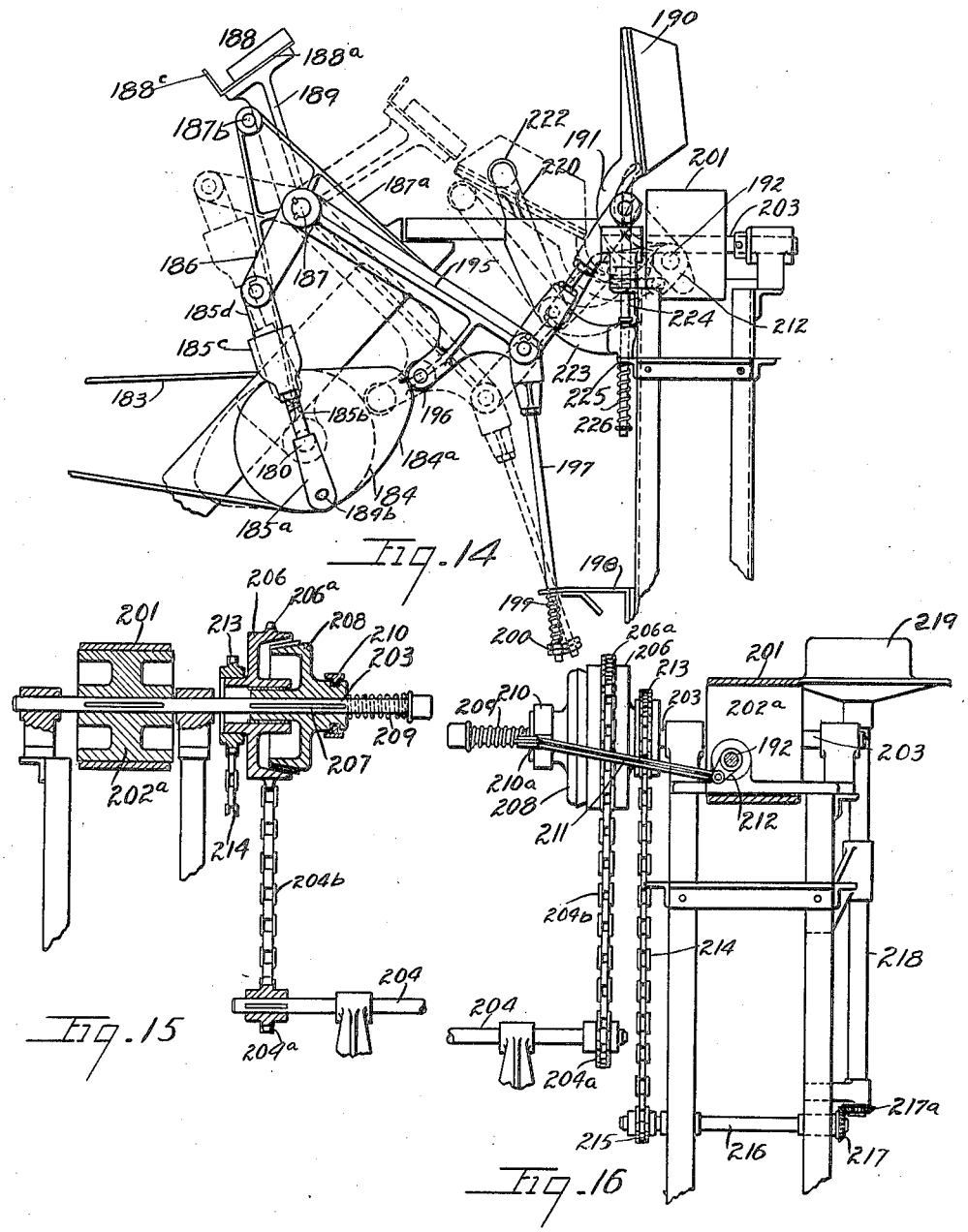

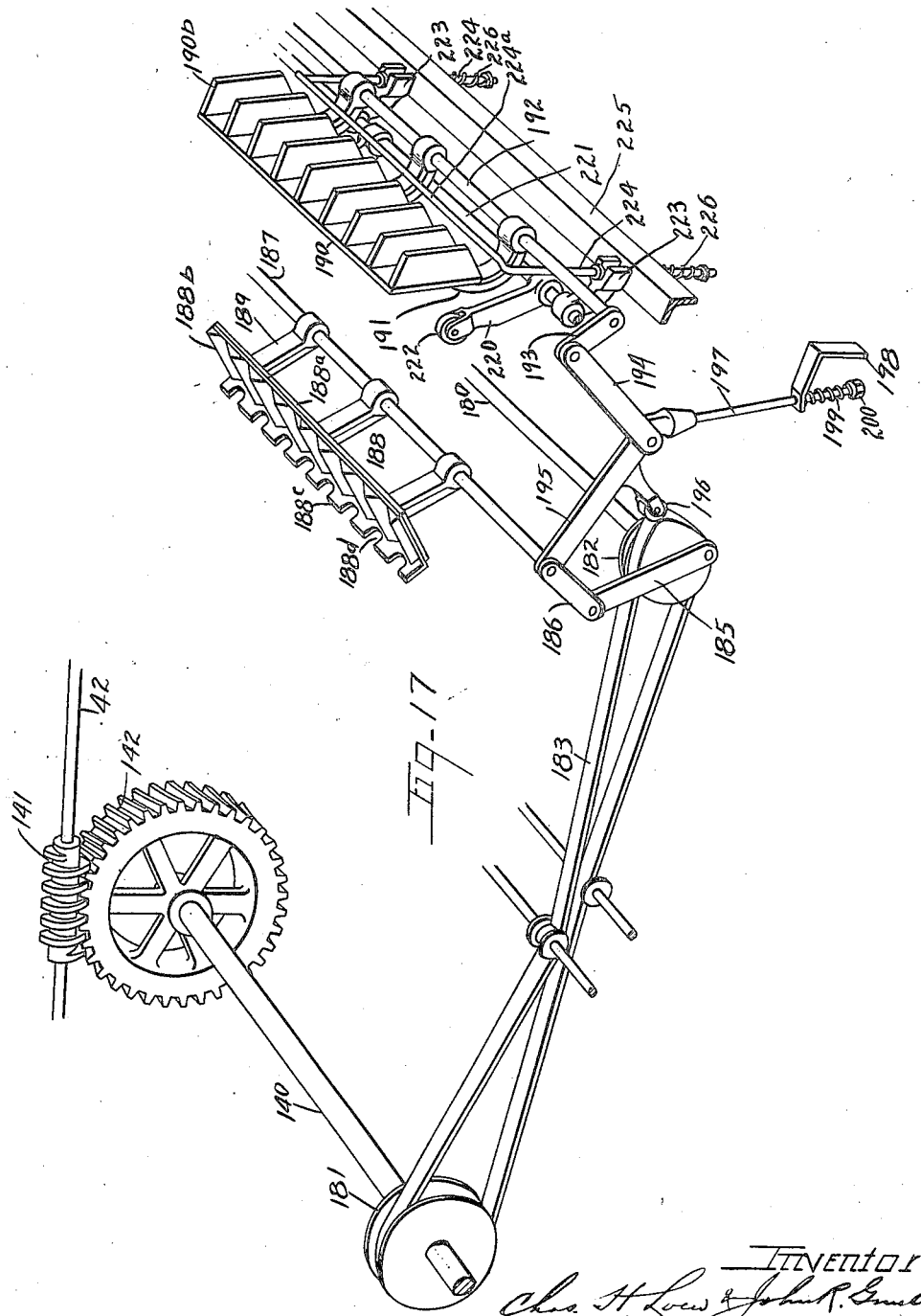

Patented July 31, 1923.

1,463,763

UNITED STATES PATENT OFFICE.

CHARLES H. LOEW AND JOHN R. GRUETTER, OF LAKEWOOD, OHIO.

BOTTLE-CLEANING APPARATUS.

Application filed March 17, 1917. Serial No. 155,422.

*To all whom it may concern:*

Be it known that we, CHARLES H. LOEW and JOHN R. GRUETTER, citizens of the United States, residing at Lakewood, in the county of Cuyahoga and State of Ohio, have invented a certain new and useful Improvement in Bottle-Cleaning Apparatus, of which the following is a full, clear, and exact description, reference being had to the accompanying drawings.

This invention relates to bottle cleaning apparatus and more particularly to an apparatus wherein the bottles are conducted by a conveyor through an enclosure wherein they are subjected repeatedly to the action of cleaning liquid, applied externally and internally to the bottles. It is the general object of the invention to provide an apparatus wherein the bottles will be thoroughly and efficiently soaked, cleaned, and sterilized and the labels removed therefrom in their transit through such apparatus; to secure this result in a more efficient manner than has heretofore been accomplished; also to secure this result in and through an apparatus wherein a major proportion of the operations will be accomplished in and through automatically operating means. Further and more limited objects of the invention will appear in the specification hereinafter and will be secured in and through the combinations of elements embodied in the claims hereto annexed.

The apparatus which is illustrated and described herein comprises generally an enclosure having a plurality of jetting stations at which water is supplied under forceful pressure to the bottles to be cleaned; an intermittently operated conveyor which conducts the bottles, arranged in transverse rows thereupon, in operative relation to and past said stations; pumps for forcing the cleaning liquid into and against the bottles; means for heating the liquid supplied to certain of said stations; means for removing the labels for the apparatus; means for brushing the bottoms of the bottles prior to their delivery from the enclosure; automatically operating means for applying the bottles to the conveyor at the front or receiving end of the apparatus; means for automatically removing the cleansed bottles from the delivery or rear end of the apparatus; and a transverse conveyor and a turntable for conducting the bottles so delivered to the operator at one side of the rear or delivering end of the machine or to a conveyor leading to a bottle filling machine.

Figure 6:
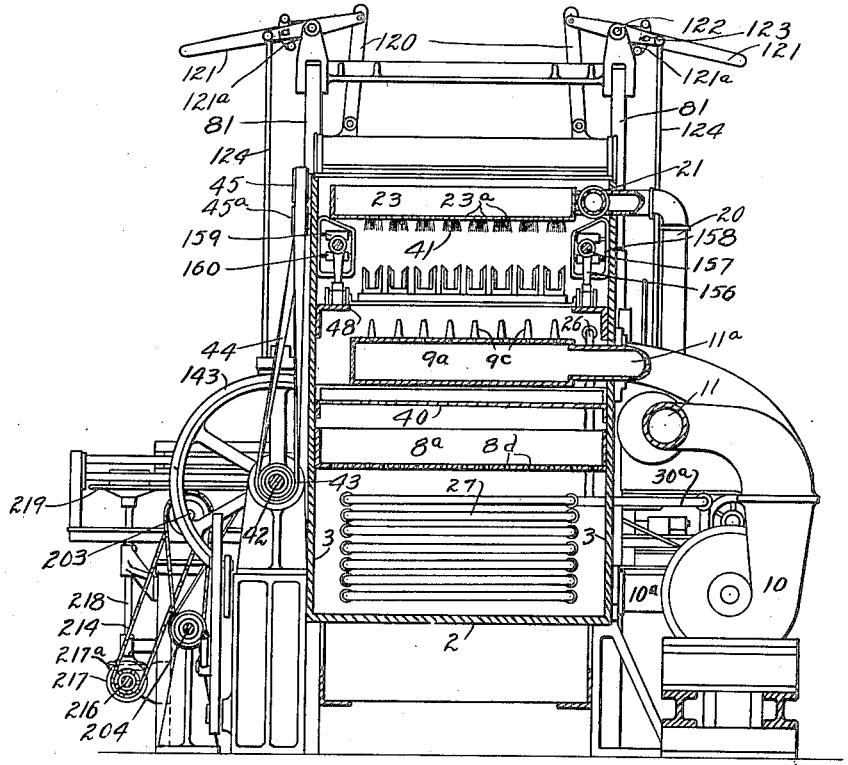
Figure 8:
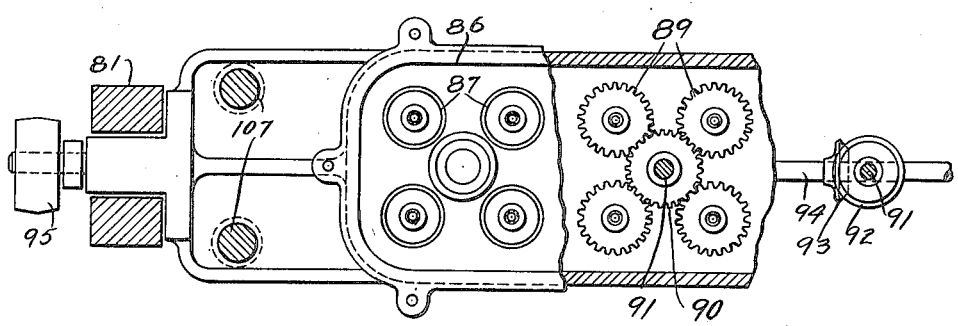

In the drawings forming part hereof, Fig. 1 represents a side elevation of the apparatus referred to; Fig. 2 a plan view of the same; Figs. 3 and 3ª jointly a longitudinal sectional view through such apparatus; Fig. 4 an elevation of one side of the delivery end of the apparatus and Fig. 5 a similar view of the opposite side of the same; Figs. 6 and 7 are sectional details corresponding respectively to the lines 6—6 and 7—7 of Fig. 3ª and looking in the direction of the arrows applied to such lines, respectively; Fig. 8 a detail corresponding to the line 8—8 of Fig. 7; Fig. 9 a detail in plan and Fig. 10 a detail, partly in elevation and partly in section, of one of the bottle conveyor elements; Fig. 11 a detail, partly in elevation and partly in section, of a portion of the bottle conveyor and a cooperating portion of a washing box therebeneath; Fig. 12 a plan view of the delivery end of the apparatus including the delivery and transfer racks, the transverse conveyor and the turn table; Fig. 13 an end elevation of the parts shown in Fig. 12; Fig. 14 is a detail in elevation of the transfer and delivery racks, the cooperating positions of the parts being indicated in dotted lines; Fig. 15 a detail in section, and Fig. 16 a detail in elevation and section, of the transverse delivery conveyor and its associated parts; Fig. 17 a diagrammatic perspective view of the transfer and delivery racks and their operating means; Fig. 18 a detail in elevation, and Figs. 19 and 20 details in section, of the driving connections between the worm wheel shaft and the reciprocable washing box at the final cleansing station; Fig. 21 a detail in perspective illustrating the connection between the label scraper and the endless belt by which it is driven; Fig. 22 a detail in section and elevation through such label removing means. Fig. 23 a sectional detail of the bottle removing means.

*Enclosure and liquid supplying devices.*

The enclosure comprises generally a tank 1 having a bottom 2, side walls 3 and end walls 4, 4ª, the end wall 4ª (see Fig. 3ª) having a horizontal extension 4$^b$, an upwardly inclined extension 4$^c$, and a vertical extension 4$^d$. The side walls support a roof 5 which is extended at the front or receiving end, as indicated at 5$^a$, so as to overhang the wall 4 and certain parts of the mechanism in front of said wall. This top wall or roof 5 comprises a plurality of transversely extending removable sections 5$^b$ (see Fig. 2) whereby access may be had to the parts therebeneath.

Within the tank 1 there is a heating coil 6 supplied by steam from any convenient source whereby the solution in said tank (as caustic soda) is maintained at a temperature of about 165° F., this liquid being protected against the entry of labels and other sediment coming from the bottles thereabove by means of a cover comprising a centrally curved section 7 and upwardly inclined section 7$^a$, 7$^b$, the central section being perforated, as indicated at 7$^c$ (see Figs. 3 and 22) whereby it forms a strainer. At the bottom of the inclined section 7$^a$ and the adjacent end of the section 7 there is a box 8 which constitutes part of the cover for the main tank 1, a similar box 8$^a$ being provided at the rear end of the section 7 and the lower front end of the section 7$^b$. These boxes each project through one side of the apparatus (see Fig. 2) and the projecting portion of each box is provided with a cover 8$^b$. In addition, the boxes are slidably mounted upon rails 8$^c$ whereby they may be removed should occasion require. The bottom and side walls of the boxes are perforated, as shown at 8$^d$, whereby the liquid on the labels scraped thereinto (as well as liquid entering in any other manner) may be delivered into the main tank.

Liquid from the compartment included between the bottom 2 and the sections 7$^a$ and 7$^b$ is forced to a pair of jet boxes 9 and 9$^a$ by means of a pump 10 the inlet 10$^a$ whereof communicates with the bottom of the tank and the delivery whereof is provided with branches 11 and 11$^a$ discharging respectively into the boxes 9 and 9$^a$. The intake side of this pump will be provided with a strainer to prevent any sediment that may enter the tank 1 from being carried into the pump. These strainers may be of any approved construction such, for instance, as shown in our copending application No. 721,107, and illustration and detailed description of the same are hence omitted herefrom. The boxes 9 and 9$^a$ are provided with transverse series of jet nozzles 9$^b$, 9$^c$, respectively, arranged to discharge into the mouths of the bottles on the conveyor thereabove as well as against the sides of the bottles as they are being moved. The pump 10 is shown as driven by an electric motor 12 through the shaft 13. This shaft is extended to the rear of the pump 10 and there provided with a pulley 14 (see Figs. 1 and 4) which, through a belt 15 and a pulley 16, drives the shaft 17 of a second pump 18. The inlet side of the pump 18 is connected with a tank 19 having for its bottom the walls 4$^b$ and 4$^c$ and for its rear side the wall 4$^d$, the front wall being indicated at 19$^a$. Water from the tank 19 is forced by the pump 18 through the pipe 20 to the pipe 21 extending longitudinally of the apparatus and beneath the cover 5, said pipe being connected at one end with the external rinsing jet box 22 at the front of the apparatus and at its other end with a similar rinsing jet box 23 at the rear of the apparatus, each box being provided with transverse series of jet openings, indicated at 22$^a$ and 23$^a$, respectively. The temperature of the water supplied to the box 22 will be about 135° F. and that supplied to the box 23 will be about 130° F., this difference in temperature being due to conducting the liquid through the long pipe 20 extending from the pipe 19 to the front of the apparatus, the water in the pipe being meanwhile subjected to the relatively high temperature within this part of the apparatus due to the temperature of the water supplied to the jets of the boxes 9, 9$^a$.

The tank 19, from which the pump 18 is supplied receives the waste water from the rinsing box 23; also the waste water from the jet box 24 which is located below the bottle conveyor and provided with transverse series of jet nozzles 24$^a$. The jet box 24 is connected by a pipe 26 with coils 27 and 27$^a$ located respectively in the rear and the front portion of the main tank, the coils being connected by a pipe 27$^b$. The front coil 27$^a$ is connected to a transverse series of jet nozzles 28 by means of a pipe 28$^a$. Liquid for the coils 27 and 27$^a$ is supplied by a two-stage pump 29 (see Figs. 1 and 4), the intake whereof communicates with a tank 30 arranged beneath the final cleaning station and which tank receives the waste water from such station. The delivery pipe 30$^a$ from the pump 29 communicates with the coil 27, and the water which is warmed by the solution in the tank 1 is forced by the pump 29 to the nozzles 24$^a$ and 28. The parts are so proportioned that the temperature of the water supplied by the jets 28 and 24$^a$ is about 120° F., and 100° F., respectively.

It will thus be seen that the bottles in their transit above the tank and beneath the cover 5 are subjected successively to liquid at a temperature of about 120° F., 135° F., 165° F., 130° F. and 100° F. It will be observed also that, because of the length of the boxes 9 and 9$^a$ and the large number of transverse series of nozzles carried jointly thereby, the bottles will be subjected to a most thorough internal cleansing by the caustic soda solution at a temperature of about 165° F. The arrangement described prepares the entering bottles for the high temperature cleaning liquid discharged through the nozzles 9$^b$ and 9$^c$; after having been thoroughly cleaned by the high temperature caustic solution, the bottles, by being conducted through and past the boxes 23 and 24, are gradually reduced in temperature to the point where they can withstand, without fracture, the cold water at the final cleaning station, located outside of the tank proper and which will be described in detail hereinafter.

Reference has been made heretofore to the pump 18 taking from the tank 19 a mixture of liquid discharged from the jet box 23 and the jet box 24 and to the fact that the temperature of the liquid discharged from said boxes is respectively about 130° F. and 100° F. The bottles, after having passed above the jet boxes 9 and 9$^a$ and having been subjected for so long a period to the high temperature liquid supplied therefrom, are themselves heated to a temperature approximating that of the liquid. Such being the case, these bottles impart such an amount of heat to the water discharged thereupon from the box 23$^a$ and thereinto from the box 24 that the temperature of the water in the tank 19 will be approximately 130°; hence the liquid supplied to the box 23 will be approximately 130° F. while that supplied to the box 22 will be somewhat higher owing to the exposure of the pipe 20 to the higher temperature within the casing above the boxes 9 and 9$^a$.

Reference has been made hereinbefore to the boxes or tanks 8 and 8$^a$ and to the perforations in the concaved central section 7 of the cover of the tank 1. This section 7 not only serves as a strainer for preventing labels and other sediment from entering the tank 1 while allowing the sterilizing solution to return thereto, but cooperates with a label remover and with the boxes or tanks 8 and 8$^a$ in a manner which will now be described:—31 denotes stud shafts carried by the side walls of the tank and supporting sprocket wheels 32. Each pair of sprocket wheels drives a chain indicated at 33. To the proximate sides of these laterally spaced chains a rod 34 is connected, a convenient manner of so connecting the rod being indicated in Fig. 21, wherein a special side plate 35 is provided for each chain, which side plate is extended to provide openings 36 adapted to register with corresponding openings 36$^a$ in a similar plate having a sleeve 37 which supports one end of the rod 34. The plates 35 and 35$^a$ being connected as by means of bolts 36$^b$, the two chains will serve to drive the rod 34. This rod in turn operates a scraper which is arranged to slide back and forth upon the section 7. The scraper is shown as provided with opposed scraping edges 38 carried by longitudinally spaced branches, the central portion of the scraper being pivotally connected to links 39 the opposite ends whereof are pivoted upon the rod 34. Stop collars 34$^a$ are shown as cooperating with the sleeves 39$^a$ on the links whereby the links are properly centered upon the rod. It will be evident that, as the sprockets are driven, the scraper will be moved back and forth along the section 7 and that any labels or other débris that may be on said section will be scraped into the receptacles 8 and 8$^a$.

As some labels may be removed before the bottles are carried above the wall or shelf 7, an inclined wall 40 is provided above the section 7$^a$, the sprockets 32 and the box 8, said wall extending from the front wall of the tank above the section 7 and beneath the box 9. Should any labels be dropped upon the section 7$^b$, the inclination of said section will carry them into the receptacle 8$^a$. It will be noted that water discharged from the jets 22$^a$ will be collected in a tank 22$^b$ which is provided with a waste pipe connection 22$^c$ whereby the contents may be discharged to the sewer. With this arrangement, only liquid which is pumped from the tank 1 is returned thereto and this liquid is strained before reentering the tank by means of the perforations in the shelf or section 7 and in the receptacles 8, 8$^a$.

It will be noted that, between the jet boxes 23 and 24, there is located a rotary brush 41 which operates upon the bottoms of the bottles after the bottles have received their last external washing from the jet box 23. This brush may be driven in any convenient manner from the shaft 13, as by countershafting including the shaft 42, pulley 43, belt 44, pulleys 45, 45$^a$, pulley 46 and sprockets 47 and 47$^a$, the last mentioned sprocket being on the brush shaft 41$^a$. The driving connections between the shaft 42 and shaft 13 will be set forth hereinafter in connection with other parts of the apparatus.

*Conveyor mechanism.*

Cooperating with the various cleaning stations is the mechanism for conveying the bottles in operative relation thereto. This mechanism is substantially identical with that illustrated, described and claimed in our application No. 721,107 filed September 18, 1912. It consists essentially of an endless conveyor made up of a plurality of elements, each element comprising two transverse series of bottle supporting members, the elements being connected by side links or plates in the fashion of a chain and said side links or plates being provided with projections or detents which are arranged to be engaged by pawls carried by reciprocable bars, said bars being driven intermittently from the motor shaft 13. 48 denotes the rails which are adapted to support the conveyor. One element of the conveyor constructed as described is shown in Figs. 9 and 10 and comprises generally a transverse frame comprising a pair of side straps 49 connected at their ends by angle bars 50 and having bolted thereto castings 51, each casting comprising four bottle supports. Each bottle support is shown as having a plurality of vertical fingers 52 radially disposed about a central opening, each finger being preferably V-shaped in section and said fingers having their upper ends beveled upwardly and outwardly from the central opening. The fingers 52 project upwardly from an annular base 53 and unite such base with a ring 54 forming a bottle mouth seat or support. Openings 55 are provided between the rings 53 and 54 and between the bases of the fingers 52, the openings being shown as disposed about 90° apart and grouped around a common central opening 56 provided within the ring seat 54.

The ends of the frame comprising the straps 49 and cross bars 50 are connected to the side plates 57 by means of flanges 58 projecting from the angle bars 50 and bolted to flanges 59 projecting from the links. Each link has a pair of upwardly projecting shoulders 60 providing each a ratchet tooth, whereby the conveyor will be driven at half the speed contemplated in our application No. 721,107, each row of bottles thereon being subjected to the action of each transverse series of jets. One end of each link is widened to receive the narrow end of the adjacent link, and the other end of each link is narrowed as indicated at 61 to fit into the widened end 62 of its adjacent link, the links being connected by pins 63, as is usual in chain construction and each link is provided with a roller 64 which serves to support the lower branch of the conveyor on rails 65 located beneath the tank (see Fig. 3). The bottom of each link is preferably channel shaped in cross section, as will be seen by reference to Fig. 10, and the upper branch of the conveyor is supported by the engagement of these channel shaped links with the tracks 48. The conveyor passes over guiding and supporting wheels 66 and 67 located respectively at each side of the front and back of the apparatus, the first mentioned wheels being preferably carried by a shaft 68 supported in journal boxes 69 adjustably mounted upon guides 70, which journal boxes may be moved along said guides by means of adjusting screws 71 extending through brackets 72, this arrangement permitting of the taking up of the slack in the conveyor from time to time.

*Final external rinsing station.*

Reference has been made heretofore to the final washing or cleaning station which is located outside of the tank at the delivery end thereof. This final cleaning station comprises a front series of fixed jet nozzles, a rear series of such nozzles, and two intermediate series of rotary hollow brush-carrying spindles carried by a reciprocating box whereby the spindles are projected into the bottles thereabove; with clamping means for the bottoms of the bottles and means, operative by the movement of the said box, for automatically moving the said clamping means,—provision, however, being made whereby the connection between the means for operating the bottle clamps and the means for reciprocating the box may be broken, if desired. 73 denotes a pipe conducting water from any suitable source, as the city main. This pipe is provided with a valve 74 (see Fig. 5) and with an automatically operated valve 75 thereabove. At its upper end, the pipe 73 is connected with the two manifolds 76 and 76$^a$ carrying respectively the front jet nozzles 77 and the rear jet nozzles 77$^a$. At a point above the valve 75, a flexible pipe 78 leads from the pipe 73 to the water box 79, said box being located above the tank 30. This box is conveniently formed as a casting with the reciprocable frame 80, said frame being slidably mounted in the upright guides 81. Between the top and bottom of this box there extends a wall 82, said wall having downwardly depending hubs or sleeves 83 closed at their bottoms except for a central opening 84 which is in communication with the liquid space provided between said wall and the bottom plate 85. The cover 86 for the box is also provided with a plurality of sleeves 87 corresponding to the sleeves 83 and forming therewith journals for the lower ends 88 of hollow spindles, said spindles having each a bore registering with the aperture 84 in the bottom of the sleeve 83 and being provided with brushes 88$^a$. Each spindle has a gear 89 rigid therewith between the cover 86 and the wall 82. By reference to Fig. 8, it will be seen that the gears 89 of the two transverse series of spindles mesh in groups of four with a common driving gear 90, said driving gear being carried by a shaft 91, the shafts for the last mentioned gears projecting upwardly through the bottom 85 and the wall 82, each shaft 91 at its lower end being provided with a bevel gear 92 meshing with the corresponding bevel gear 93 on the shaft 94, the last mentioned shaft being driven by a pulley 95 which is in turn driven by a pulley 96 (see dotted lines, Fig. 4) through a belt 97, the pulley 96 being driven by a shaft 98 of a motor which is mounted on a platform 99 rotatably connected to a standard 100, as indicated at 101. A distance or radius rod 102 keeps the pulleys 95, 96 a fixed distance apart during the reciprocation of the water box 78.

The upper ends 88$^b$ of the hollow spindles 88 project into sleeves 103 which enclose the brushes 88$^a$ when the spindles are in their lowered positions, the lower ends of the sleeves forming a close fit with the bodies of the spindles and the upper ends being tapered into nozzle shape, as shown at 103$^a$ (see Fig. 7); the discharge ends of the nozzles form a fairly close fit with the reduced portions and the brushes of the spindles that are projected therethrough and such nozzle portions are provided, near but below their discharge ends, with frusto-conical enlargements 104 adapted to engage cooperating conical seating recesses provided in the bottom of the conveyor thereabove, the nozzle tips 103$^a$ then registering with the central openings 56 at the tops of the conical recesses. The sleeves 103 are carried by a plate 105 which is fastened to a frame 106 which is reciprocable on the guides 81 and which is connected to the frame 80 by means of rods 107, there being nuts 107$^a$ and 107$^b$ on the opposite ends of said rods, the frame 80 being arranged to slide upon said rods. On the return stroke of the box 79, the frame 106 will be pulled down to the position shown in Fig. 7 through the engagement of the frame 80 with the nuts 107$^b$. The frame 106 and its connected parts are overbalanced by means of weights 108 on levers 109 which are pivoted to brackets 110 carried by the frame of the machine, the ends of the levers opposite the weights being pivotally connected to links 111, the lower ends whereof are pivotally connected to the frame 106, as indicated at 112—see Figs. 4 and 7.

Mounted on the guides 81 is the bottle clamping frame which frame comprises a pair of channel shaped side castings 113 with transversely extending top and bottom plates 114 and 115 forming guideways for the clamps which engage the bottoms of the bottles, each clamp comprising a stem 116 extending through said plates and having each a stop pin 116$^a$ above the plate 114 and a hollow bottle cup 117 adapted to receive therewithin and fit against the bottom of an inverted bottle 118 on the conveyor therebeneath. A spring 119 surrounds each stem 116 between the cup thereon and the plate 115, whereby, as the clamping frame descends, the clamps will yieldingly engage the bottoms of the bottles therebeneath. The clamping frame is operated by the frame 106, being connected thereto in such manner that, when the frame 106 is elevated, the clamping frame will be depressed, and vice versa. This clamping frame is suspended by links 120 pivotally connected thereto, each link being provided with a plurality of vertically spaced openings 120$^a$ in the upper end thereof by means of which it may be adjustably connected to a lever 121 pivoted to a bracket 122 on the upper ends of the guides 81. This lever carries a segment 121$^a$ having apertures 121$^b$ therein by means of which it may be adjustably connected to a lever 123 (as by means of a pin 123$^a$) pivoted to the bracket 122. The levers 123 are connected to lateral projections of the frame 106 by means of rods 124, the rods extending through the lateral projections and being provided each with a collar 124$^a$ and a nut 124$^b$.

The water box 79 and its connected parts are counterbalanced by the weights 125 mounted on levers 126 which are keyed to a rock shaft 127 extending transversely of the apparatus. The ends of the levers 126 opposite the weights are pivotally connected to a link 128 the lower end whereof is pivotally connected to the water box—see Figs. 4 and 5—and one of the levers 126 is connected by means of a link 129 and a lever 130 with the automatic valve 75 whereby, as the box 79 is moved upwardly, the upward movement of the part of the lever 126 connected thereto will open the valve 75 and turn on the water supply, under the pressure of the main, to the box while, on the reverse movement, the valve will be closed by said lever.

The box 79 is raised and lowered through mechanism operated from the shaft 13. This mechanism comprises a pair of links 131, one on each side of the apparatus, each link being connected at its lower end to the box and at its upper end to a lever 132 rigid with the rock shaft 133. One end of this rock shaft has rigidly connected thereto an angle arm 134 having a slot 135 therein forming a guideway for a cross head 136 mounted on a screw 137, said cross head being connected by a link 138 to a crank drum 139 on a worm wheel shaft 140, which shaft is driven from the shaft 13 through the shaft 42 (see Fig. 5), the worm 141 and the worm gear 142, the shaft 42 being driven by means of the pulley 143, belt 144 and pulley 145 on the shaft 13.

But for the weight of the frame 80 and its associated parts, the weights 108 would elevate the frame 106 and thus depress the bottle clamp frame. This action, however is prevented by the rods 107 and nuts 107$^a$, 107$^b$ until such time as the frame 80 is elevated by its operating mechanism. On the return stroke of the frame 80, the frame 106 will be pulled down against the action of the weights 108 and the bottle clamp frame will be elevated through the connections between the same and the frame 106.

Reference has been made heretofore to the provision of means whereby the box 79 (and consequently the frame 106) and the bottle clamp frame will not be reciprocated. This provision may be conveniently accomplished by means shown in Fig. 4 and in detail in Figs. 18, 19 and 20. It will be noted that the crank drum carried on the end of the shaft 140 is made up of two parts, one rigidly connected to the crank shaft and the other connected to the first part. It will be evident that, by breaking this connection, the rotation of the shaft 140 will not necessarily produce a rotation of the second part of the crank drum to which the link 138 is connected. Referring to the figures, 146 denotes the drum member which is rigid with the shaft, being conveniently connected thereto by means of the pin 147 extending through the hub portion of said member. The other member 148 is provided with a cylindrical sleeve 149 which is mounted upon the hub of the first member, there being an anti-friction bushing 150 interposed between said hub and sleeve, and the ring 151 covering the joint between the hub of the fixed member and the sleeve of the member 148. The crank pin 152 by which the lower end of the link 138 is connected to the drum is carried by the member 148. At one side of this connection, the members 148 and 146 are provided with registering bores 153 and 153ª respectively, said bores being adapted to receive a pin 154 which is mounted in the bore 153 and is adapted to be projected into the bore 153ª, being provided with a projection 154ª for convenience of operation. When in the full-line position shown in Fig. 20, the pin 153 may be locked in driving position by means of the screw 155. In order to retract the pin 153, it is necessary that it be moved into an extension 153ᵇ of the fixed member, said extension having a slot into which the projection 154ª may be moved only at one period of each revolution of the shaft 140 because of the varying angular relation between the lower end of the crank 138 and the cooperating portion of the crank drum. When the parts register, the screw 155 may be loosened and the pin 154ª retracted to the position indicated in dotted lines in Fig. 20—which will break the driving connection between the shaft 140 and the link 138.

It is apparent that, by the construction described and illustrated, the bottles that reach the final rinsing station will be supplied first with cold water through the fixed jets 77, then with cold water through the reciprocating spindles 88 which also internally brush the bottles and finally with cold water from the fixed jets 77ª; also that, under normal conditions, the nozzles 103ª will be projected into substantial engagement with the bottoms of the apertures 56 in the conveyor thereabove with the projections 104 seated in the conical bottoms provided below such aperture and that the bottoms of the bottles will be held clamped during the operation of reciprocating the spindles within the bottles; also that as the box 79 moves downwardly, the frame 106 will be retracted and the bottom clamps will be elevated. The adjustments provided between the links 120, levers 121 and levers 123 permit a corresponding adjustment of the bottle clamping frame thereby to accommodate bottles of varying lengths.

*Conveyor drive.*

The means for driving the conveyor is substantially the same as shown, described and claimed in our copending application 721,107 referred to hereinbefore and comprises the ratchet teeth 60 on the side links of the conveyor elements, which ratchet teeth are adapted to be engaged by pawls 156 pivotally connected to a pair of hollow or tubular rods 157. For the purpose of securing and guiding the rods 157 in their movements the upper or cover portion of the tank is provided with a plurality of supporting brackets 158 each having a pair of vertically spaced rollers 159, 160, in engagement with which the pawl-carrying rods may be reciprocated. The rods are driven intermittently by means of a transverse rock shaft 161 (see Fig. 5) extending across the tank and having a pair of vertically extending rock arms 162 connected thereto, the upper end of each rock arm being connected to the pawl-carrier rod by means of a link 163 pivotally connected to said rod. The rock shaft 161 is driven from the shaft 13 through the shaft 140 and a crank 164 thereon at one side of the apparatus, said crank being connected with a cross head 165 mounted in a guideway 166 in a rock arm 167, the rock arm being pivoted to a stud shaft indicated at 168 and being connected by means of a link 169 and a rock arm 170 with the shaft 161, there being a spring 171 connected to the rock arm 170 for the purpose of counterbalancing the rock arm 167 and cushioning the movements of the connected parts. By this construction, a slow recovery stroke and a quick driving stroke are imparted to the pawl carriers, the parts being practically at rest during the greater part of the vertical movement of the end of the crank arm 164. This provides a simple and efficient construction for feeding the bottle conveyor along the rails by an intermittent movement while enabling the bottles to remain in a stationary position a sufficient length of time to insure the filling of the bottles with liquid and the sufficient rinsing of the outsides of the bottles by such liquid.

Charging mechanism.

The charging mechanism comprises generally a bottle receiving and charging rack having a transverse series of compartments equaling in number the bottle holders in each transverse series on the conveyor, with means operated automatically from the conveyor drive, and hence from the pump shaft, for tilting the said rack thereby to deliver the bottles to the conveyor seats. This construction is illustrated in Figs. 1, 2 and 3. The rack 172 comprises a bottom board or plate 172$^a$ having triangular spacers 172$^b$ thereon, the spacers providing therebetween seats or compartments for the bottles, the bottles resting in said seats upon their sides with the bottoms against the shelf 172$^c$. The bottom 172$^a$ is rigidly connected to a rock shaft 173, which may be conveniently supported by brackets 174 on each side of the front or receiving end of the apparatus. This rock shaft is provided with a pair of arms 175 rigid therewith to the upper swinging ends whereof are connected links 176, the front ends of these links being connected to the lower ends of levers 177, the middle portions whereof are mounted upon a rock shaft 178 supported in brackets 179, the upper ends 177$^a$ of said levers being forwardly curved and engaging pins 177$^b$ on the pawl carrying rods 157. When in position for the operator to apply the bottles thereto, the rack 172 is supported by means of a rod 179 on brackets 179$^a$ which may be conveniently connected to the brackets 174. In Fig. 3 the conveyor or drive rods 157 are shown in their forward positions. When moved rearwardly by the mechanism hereinbefore described, the pins 177$^b$ will rock the levers 177 and will thereby swing upwardly and forwardly, the bottle rack 172 permitting the bottles thereon to slide into the appropriate row or transverse series of seats on the upwardly inclined portion of the conveyor therebeneath, the bottles being delivered thereto in the position indicated in Fig. 11, — bottoms up. It will be observed that the bottle charging parts are arranged in operative relation to the upwardly extending branch of the conveyor between the wheels 66 and the front ends of the rails 48, whereby the bottles will slide to their seats on the conveyor without dropping sharply thereinto. Because of the slow movement of the rods 157 on their return stroke, the bottle rack 172 will be moved gradually from receiving to discharging position; furthermore, because of the engagement of the arms 177$^a$ with the pins 177$^b$, the rack will be eased downward to its receiving position on the rod 179 by the driving stroke of these rods.

Delivery or discharging mechanism.

This mechanism, as shown herein, comprises a take-off rack which is adapted to remove the transverse rows of bottles in succession from the conveyor as it passes under said rack, a delivery rack into which the bottles are delivered from the take-off rack, a transverse delivery conveyor which receives the bottles from the delivery rack, and a turntable cooperating with the delivery conveyor to bring the bottles discharged thereupon by the delivery conveyor into convenient position to be removed by the operator, or deliver the bottles onto another conveyor or (not shown) lead to a filling machine. This mechanism is shown more particularly in Figs. 4, 5, 6 and 12 to 17 inclusive. 180 denotes a shaft extending across the rear delivery part of the frame and journaled in brackets 180$^a$. This shaft is driven from the shaft 140 by means of pulleys 181, 182 and a belt 183. Keyed to one end of the shaft 180 is a combined cam and crank disk, the disk being indicated at 184 and the cam at 184$^a$. 185 denotes a pitman which is connected to the crank disk 184. This pitman (see Figs. 4 and 23) comprises four parts, 185$^a$, 185$^b$, 185$^c$ and 185$^d$. The part 185$^a$ is connected to the crank pin 184$^b$; the part 185$^b$ is a rod projecting into the part 185$^c$ and is provided at its upper end with a head 185$^e$. The part 185$^c$ is a cup having a seat 185$^f$ in its lower end for a helical spring 185$^g$ through which the rod 185$^b$ extends and the upper portion whereof is engaged by the head 185$^e$. The cup 185$^c$ is internally threaded for the externally threaded lower end of the part 185$^d$. The last mentioned part has a bore 185$^h$ which is adapted to receive the head 185$^e$ and the upper portion of the helical spring 185$^g$. The link 185 is, therefore, longitudinally adjustable and provides a yielding, lost-motion driving connection between the shaft 180 and the rock shaft carrying the take-off rack, being connected to one end of a lever arm 186 rigid with the said rock shaft 187 which is supported in the side brackets 187$^a$.

The take-off rack is indicated generally at 188. This rack is similar to the rack 172, comprising a bottom board 188$^a$ having triangular spacers 188$^b$ providing seats or compartments therebetween for bottles, the shelf 188$^c$ being provided with notches 188$^d$ which are adapted to receive the necks of the bottles as the conveyor passes beneath said shelf, the shelf 188$^c$ supporting the bottles by engagement with the rounded portions thereof which connect the necks with the bodies (see Fig. 5). The shelf 188 is provided with a plurality of arms 189 by which it is keyed to the shaft 187 and a rail 187[b] carried by the brackets 187[a] serves to limit its movement toward the conveyor.

Cooperating with the take-off rack 188 is the delivery rack 190. This rack comprises a flat bottom board 190[a] which is provided with a plurality of partitions 190[b] having their ends beveled, said partitions providing open-ended compartments for the bottles delivered thereonto by the rack 188. The rack 190 is provided with arms 191 by which it is rigidly connected to a rock shaft 192. The arms 191 are curved whereby the rock shaft 192 may be brought into proper and convenient relation to the transverse carrier, to be described hereinafter and as indicated on Figs. 4, 12 and 13. The shaft 192 is provided with a crank arm 193 projecting upwardly and forwardly therefrom and said arm is connected by a longitudinally adjustable link 194 with the lower end of an arm 195 which is sleeved on the shaft 187, said arm carrying a roller 196 adapted to engage the cooperating cam 184[a]. 197 denotes a rod which is connected at its upper end to the pivot between the link 194 and arm 195 and having its lower end extended through a bracket 198 and being provided below said bracket with a spring 199 and nut 200, whereby said spring serves to draw the arm 195 downwardly when the roller rides off the high part of the cam serving to hold the roller in contact with the cam.

Through the construction of the parts 180–200 inclusive the rotation of the shaft 180 enables the rack 188 to take the bottles off the conveyor during the rest period of the conveyor and to deliver the bottles onto the delivery rack 190 which is moved into the receiving position indicated in dotted lines in Fig. 14, the take-off rack being returned to bottle-receiving position by the time the conveyor has advanced the next step, and the delivery rack being swung into the position indicated in full lines in Fig. 14 whereby the bottles may slide upon the transverse conveyor therebeneath.

The manner in which the rack 188 is driven enables it to be moved quickly from delivering to receiving position, its movement toward the main conveyor being positively stopped by the rail 187[b] engaging the arms 189. It remains in this position a sufficient length of time to enable the bottles on the conveyor to be advanced to bring their necks into the notches 188[d]; it is then rocked to its delivery position, where it remains long enough to enable the bottles to slide into the delivery rack, and is rocked back again to receiving position during the inactive period of the main conveyor. The "dwell" of the take-off rack at receiving and delivering positions is due to the construction of the pitman and its connection to the crank disk 184. The rack is rocked to its delivery position after the head 185[c] has moved upwardly into engagement with the abutment within the lower end of the part 185[d], whereupon the shaft 187 is rocked in the appropriate direction. When the crank pin 184[b] has passed the upper center, there will be a delay in transmitting its movement to the rock shaft (with a corresponding period of rest of the rack at delivery position) until the head 185[c] has sufficiently compressed the spring 185[g], whereupon the shaft will be rocked in the reverse direction, the arms 189 striking the rail 187[b] somewhat in advance of the time when the crank pin reaches its lower center, the spring cushioning the impact of the arms against the rail. The crank pin then will move upwardly a considerable distance before its movement rocks the shaft 187, because of the lost-motion connection between the parts 185[b] and 185[d] of the pitman 185. The threaded connection between the parts 185[c] and 185[d] enables the tension of the spring 185[g] to be varied as occasion may require. As the roller 196 rides off the "high" part of the cam 184[a], the spring 199, pulling down on the joint between the arm 195 and link 194, rocks the delivery rack to the dotted-line position shown in Fig. 14, the parts being so arranged and timed that it is awaiting the arrival of the take-off rack. Through the upward movement of the joint, produced by the action of the cam, the spring is compressed, thereby cushioning the final movement of the take-off rack toward its stop and the final movement of the delivery rack toward its conveyor. It will be evident that, through the operating means described, the take-off rack and the delivery rack are moved in opposite phase or direction to each other.

The delivery conveyor is indicated generally at 201, and as here shown comprises an endless belt passing over the pulleys 202, 202[a] — see Figs 12–15 — the last mentioned pulley being mounted on a shaft 203. The shaft 203 is driven as follows: 204 denotes a counter shaft which is driven from the worm shaft 42 by means of a chain 205 and sprockets 206, 206[a]. At its rear end, the shaft 204 is provided with a sprocket 204[a], which sprocket drives a chain 204[b] which in turn drives the loose clutch member 206 on the shaft 203 through a sprocket 206[a]. 208 denotes the clutch member which is slidably keyed to the shaft 203 as indicated at 207, the clutch shown herein being of the usual conical friction type, there being a spring 209 surrounding the shaft end and tending to thrust the clutch member 208 into driving engagement with the loose member 206. 210 denotes the usual yoke for operating the clutch member 208, said yoke being carried by an arm 210ª which is connected to an arm 211, the arm 211 being connected to a crank arm 212 driven by the shaft 192 (see Figs. 12, 15 and 16) under conditions to be described hereinafter.

On the hub of the loose clutch member 206 there is a sprocket 213 which, through a chain 214, and a sprocket 215, drives a shaft 216 shown as supported in brackets or standards beneath the transverse conveyor 201. This shaft is provided with a bevel gear 217 driving, through a cooperating bevel gear 217ª, a vertical shaft 218 on the upper end whereof is mounted a turntable 219 — see Figs. 5, 12–16. This turn table comprises a disk which is located at the delivery end of the conveyor 201 and is so arranged as to receive the bottles moved by said conveyor and, by its rotation, to bring the same into convenient position to be removed by the operator, or, where desirable, to deliver the bottles in turn onto a conveyor leading to a filling machine. The bottles are delivered to the turntable through a short platform 219ª (see Figs. 12 and 13) which platform has a concave side directed toward the corresponding convex edge of the turntable. This platform is of such small extent that only one bottle will be thereon at any time and this bottle is easily pushed onto the turntable by the bottles therebehind on the conveyor. The platform is supported by an upright 219ᵇ (see Fig. 13).

It will be apparent that, by the driving connections between the worm shaft 42 and countershaft 204 and the delivery conveyor and turntable shafts, it is contemplated that the driving of the two last mentioned shafts shall be interrupted. This interruption is for the purpose of keeping the delivery conveyor and turntable at rest while the bottles are sliding from the delivery rack onto the conveyor, and to move into operative relation to the bottles, which are at one side of the conveyor, a guard rail, the guard rail being kept in operative relation to the conveyor during the movement of the latter, but being automatically moved out of the way of the delivery rack as the latter swings to delivering position and the conveyor is at rest. This result is accomplished in and through the following mechanism; 220 denotes a pair of arms rigid with the shaft 221 and each carrying at its upper end a roller 222. These rollers are in position to be engaged by the delivery rack 190 as it swings to the position shown in dotted lines in Fig. 14—that is, the position in which it receives bottles from the take-off rack 188, thereby rocking the shaft 221. This shaft carries a pair of arms 223 rigid therewith, which arms operate a vertical reciprocable guard rail comprising the uprights 224 and a horizontal rail 224ª connecting said uprights (see Figs. 3ª, 4, 12, and 14). The lower ends of the uprights 224 project through an angle iron cross brace 225, being surrounded by springs 226 bearing against said angle iron and against nuts on the lower ends of the uprights, whereby the springs serve to rock the shaft 221 to restore the arms 220 to the position shown in Figs. 3ª and 4 and in full lines in Fig. 14 and to retract the guard rail whereby it is moved out of blocking relation to the delivery rack 190 when the latter is moved up to discharge the bottles on the conveyor 201.

The purpose of projecting the guard rail upwardly is to enable it to steady the bottles which are delivered onto the side of the conveyor adjacent to said rail and which are liable to be rocking on said conveyor immediately after their delivery thereto, on account of the action of the delivery rack in discharging the bottles onto to said conveyor. The guard rail, therefore, serves to steady each successive row or series of bottles immediately after they are delivered to the transverse conveyor to prevent the same from being overturned. Furthermore, the spring 226 serves to cushion the delivery rack as it approaches the end of its movement toward the take-off rack.

As the rack 190 is moved to its delivery position with reference to the conveyor 201, the parts are so timed that, when the guard rail is depressed and the delivery rack is in operative relation to the conveyor 201, the driving connection between the shaft 204 and the conveyor and turntable is broken through the clutch mechanism, by the rotation of the shaft 192 and through crank 212 and clutch-throwing link 211; and, as the delivery rack 190 is moved to the receiving position indicated in dotted lines, the guard rail is elevated to retain the bottles in place on the conveyor 201 and said conveyor is operated to move the bottles delivered to the conveyor a distance equal to the length of one of the transverse rows of bottles delivered thereupon, the turntable being operated a sufficient distance to remove a like number of bottles from the delivery end of the conveyor and the platform 219ª.

From the foregoing description, taken with the drawings, it is believed that the general operation is clear. The motor 12 being started, the cleaning and rinsing liquids are supplied to the various jet stations, including the final internal rinsing and cleaning station. One or more operators place bottles upon the charging rack 172. Through the retraction of the pawl-carrier rods 157, these bottles are delivered to a corresponding transverse row of bottle seats on the conveyor; the conveyor is advanced one step by the pawls 156, and the rack returned to its bottle receiving position. The bottles on the conveyor are conducted past the various jetting stations, where they are subjected in succession to an internal cleaning with liquid of a temperature of about 120° supplied through the coils 27, 27ᵃ; to an external rinsing from the jets 22ᵃ, supplied with liquid at a temperature of substantially 135° F; to a prolonged internal cleaning by means of caustic solution at a temperature of about 165° supplied from the jet nozzles carried by the boxes 9 and 9ᵃ; to an external rinsing by the jets 23ᵃ with liquid at a temperature of about 130° F.; to an internal rinsing through the jets 24ᵃ with liquid at a temperature of about 100° F.; and to a final internal cleaning and brushing, in conjunction with cold water, at the station outside the casings the bottoms of the bottles being subjected to an external brushing by a transverse brush 23 before reaching the last two stations. As the conveyor approaches the rear or delivery end of the machine, the bottles in each transverse row thereof are removed successively by the take-off rack 188, delivered to the delivery rack 190, and transferred by the latter to the transverse conveyor 201 and thence to the turntable 219.

The driving connection between the rods 157 and the main conveyor mechanism operated thereby is obtained and controlled through a clutch 227 (see Fig. 5) which clutch is operated by a yoke pivoted at one end, as indicated at 228, and having its other end 229 connected to a rod 230 extending the full length of the apparatus and having an operating handle 231 at each end thereof, enabling the mechanism to be put into and out of operation from either end of the apparatus.

Owing to the manner of driving the conveyor, the bottles are given a long pause at the end of each forward movement whereby they are subjected to a relatively long cleansing action; this long pause also facilitates the charging and discharging of the bottles; the final delivery to and by the conveyor 201 is accomplished in such manner as to secure immunity from breaking through movement of the conveyor while the delivery rack is discharging thereonto, the bottles being protected against falling from the conveyor 201 immediately after their delivery thereto and during its movement by the guard rail.

Having thus described our invention, what we claim is:—

1. In an apparatus of the character described the combination, with bottle-treating means extending transversely of such apparatus, of a bottle conveyor having transverse series of bottle supports and extending in operative relation to said bottle-treating means, a drive shaft, means driven from said shaft for moving the said conveyor intermittently, a reciprocable bottle charging rack adapted to receive a transverse series of bottles and deliver the same to a transverse series of supports on the conveyor, connections whereby said reciprocable means will reciprocate the rack to bring it alternately into a position to receive bottles and into a position to discharge the same to a transverse series of supports on the conveyor, a reciprocable take-off rack cooperating with the delivery portion of the conveyor and adapted to remove each transverse series of bottles in succession from their supports, a reciprocable delivery rack adapted to receive bottles from the take-off rack, a delivery conveyor at the rear of the delivery rack adapted to receive the bottles taken thereby from the take-off rack, a guard rail at one side of the last mentioned conveyor, a turn table at the delivery end of the last mentioned conveyor, means operative from the drive shaft for reciprocating the two last mentioned racks and for moving the last mentioned conveyor and turn table intermittently whereby the last mentioned conveyor and the turn table will be at rest when the delivery rack is in operative relation to said conveyor, and connections whereby the guard rail will be moved into operative relation with the last mentioned conveyor to guard the same during its movement and will be moved out of such relation during the rest period of said conveyor.

2. In an apparatus of the character described the combination, with bottle-treating means extending transversely of such apparatus, of a bottle conveyor having transverse series of bottle supports and extending in operative relation to said bottle-treating means, a drive shaft, and connections for moving the said conveyor intermittently from said shaft, a reciprocable bottle charging rack adapted to receive a transverse series of bottles and deliver the same to a transverse series of supports on the conveyor, connections whereby the conveyor operating means will reciprocate the rack to bring it alternately into a position to receive bottles and into a position to discharge the same to a transverse series of supports on the conveyor, a reciprocable take-off rack cooperating with the delivery portion of the conveyor and adapted to remove each transverse series of bottles from their supports, a reciprocable delivery rack adapted to receive bottles from the take-off rack, a delivery conveyor at the rear of the delivery rack adapted to receive the bottles taken thereby from the take-off rack, a turn table at the delivery end of the last mentioned conveyor, and means operative from the drive shaft for reciprocating the two last mentioned racks and for moving the last mentioned conveyor and turn table intermittently whereby the last mentioned conveyor and the turn table will be at rest when the delivery rack is in operative relation to said conveyor.

3. In an apparatus of the character described, the combination, with bottle-treating means extending transversely of such apparatus, of a drive shaft, a conveyor having transverse series of bottle seats or supports, means reciprocated by said shaft for driving said conveyor intermittently, thereby to bring said support in operative relation to said bottle-treating means, a charging rack adjacent to the receiving or front portion of the conveyor adapted to receive and deliver a transverse series of bottles to one of the transverse series of seats or supports on the conveyor, connections whereby the reciprocable means for driving the conveyor will reciprocate the rack to move the same into a position for receiving bottles and into a position for delivering the same to a transverse series of seats or supports on the conveyor, a take-off rack adjacent to the delivery or rear portion of the conveyor and adapted to take from said conveyor each transverse series of bottles placed thereon by the first mentioned rack, a delivery rack at the rear of the take-off rack, a delivery conveyor at the rear of the delivery rack adapted to receive bottles therefrom, a turn table in operative relation to the delivery end of the last mentioned conveyor, connections for reciprocating the two last mentioned racks in opposite phase whereby the delivery rack will receive the bottles taken from the conveyor by the take-off rack and deliver the same to the delivery conveyor, said connections being adapted to move the last mentioned conveyor and the turn table intermittently whereby the said last mentioned conveyor and the turn table will be stationary during the period that the last mentioned rack is discharging the bottles onto said conveyor.

4. In an apparatus of the character described the combination, with bottle-treating means extending transversely of such apparatus, of a drive shaft, a bottle conveyor having transverse series of bottle supports thereon, means reciprocably driven from the shaft for intermittently moving said conveyor in operative relation to said bottle-treating means, a bottle charging rack in operative relation to the front part of said conveyor and adapted to deliver bottles to the transverse series of supports thereon, a bottle take-off rack in operative relation to the rear or delivery portion of said conveyor and adapted to remove each transverse series of bottles from the supports on said conveyor, a delivery rack movable in opposite phase from the take-off rack and adapted to receive bottles from the latter rack and deliver them to a delivery conveyor, a delivery conveyor arranged to receive the bottles from the last mentioned rack, a turn table in operative relation to the discharge end of the last mentioned conveyor, connections whereby the driving means for the first mentioned conveyor may operate the charging rack, and connections whereby the shaft may reciprocably drive the two last mentioned racks in opposite phase and intermittently drive the transverse conveyor and the turn table.

5. In an apparatus of the character described the combination, with bottle-treating means extending transversely of such apparatus, of a drive shaft, a bottle conveyor having transverse series of bottle supports thereon, means reciprocably driven from the shaft for intermittently moving said conveyor in operative relation to said bottle-treating means, a bottle charging rack in operative relation to the front part of said conveyor and adapted to deliver bottles to the transverse series of supports thereon, a bottle take-off rack in operative relation to the rear or delivery portion of said conveyor and adapted to remove each transverse series of bottles from the supports on said conveyor, a delivery rack movable in opposite phase from the take-off rack and adapted to receive bottles from the latter rack and deliver them to a delivery conveyor, a delivery conveyor arranged to receive the bottles from the last mentioned rack, connections whereby the reciprocable driving means for the first mentioned conveyor may operate the charging rack, and connections whereby the shaft may reciprocably drive the two last mentioned racks in opposite phase and intermittently drive the transverse conveyor.

6. In an apparatus of the character described the combination, with bottle-treating means, of a bottle carrier, means for moving the same intermittently in operative relation to said bottle-treating means, a reciprocable bottle charging rack arranged to deliver bottles to said carrier, a reciprocable take-off rack adapted to remove bottles from said carrier, a reciprocable delivery rack adapted to receive bottles from the take-off rack, a delivery conveyor in operative relation to said delivery rack, a turn table in operative relation to said conveyor, operative connections between the carrier driving means and the charging, take-off and delivery racks, and means for driving the turn table intermittently.

7. In an apparatus of the character described the combination, with bottle-treating means, of a bottle carrier, means for moving the same intermittently in operative relation to said bottle-treating means, a reciprocable bottle charging rack arranged to deliver bottles to said carrier, a reciprocable take-off rack adapted to remove bottles from said carrier, a reciprocable delivery rack adapted to receive bottles from the take-off rack, a delivery conveyor in operative relation to said delivery rack, operative connections between the carrier driving means and the charging, take-off and delivery racks, and means for driving the delivery conveyor intermittently.

8. In an apparatus of the character described, the combination, with bottle-treating means, of a conveyor having bottle supports thereon and means for moving the conveyor intermittently to bring the bottles on said supports in operative relation to said bottle-treating means, the conveyor-moving means including a reciprocating driving member, a charging rack in operative relation to the receiving portion of said conveyor and adapted to be moved toward and from the same, and connections between said rack and the reciprocating member whereby it may be moved into operative relation to the conveyor by the non-driving stroke of said member.

9. In an apparatus of the character described, the combination, with bottle-treating means, of a bottle carrier and means for moving the same intermittently to bring the bottles thereon in operative relation to said bottle-treating means, a bottle receiving and charging device for the carrier adapted to be moved toward and from the carrier, a bottle receiving and removing device movable toward and from the carrier, and connections whereby said devices will be brought into operative relation to the carrier while the carrier is at rest.

10. In an apparatus of the character described, the combination, with bottle-treating means, of a bottle carrier and means for moving the same intermittently to bring the bottles thereon in operative relation to said bottle-treating means, a bottle receiving and removing device adapted to be moved toward and from the carrier, and connections whereby said device will be brought into operative relation to the carrier while the carrier is at rest.

11. In an apparatus of the character described, the combination, with bottle-treating means, of a conveyor extending in operative relation to said means, means for moving the conveyor intermittently, a bottle receiving and charging device cooperating with the receiving portion of the conveyor and movable into and out of operative relation thereto, a bottle receiving and removing device cooperating with the delivery portion of said conveyor and movable into and out of operative relation thereto, and means for moving the said devices into operative relation to the conveyor while the latter is at rest.

12. In an apparatus of the character described, the combination, with bottle-treating means, of a conveyor extending in operative relation to said means, means for moving the conveyor intermittently, a bottle charging device cooperating with the receiving portion of the conveyor and movable into and out of operative relation thereto, a bottle removing device cooperating with the delivery portion of said conveyor and movable into and out of operative relation thereto, means for moving the said devices into operative relation to the conveyor while the latter is at rest, a supplemental conveyor adapted to receive the bottles removed from the first mentioned conveyor, and means for driving the last mentioned conveyor intermittently.

13. In an apparatus of the character described, the combination, with bottle-treating means, of a conveyor extending in operative relation to said means, means for moving the conveyor intermittently, a bottle charging device cooperating with the receiving portion of the conveyor and movable into and out of operative relation thereto, a bottle removing device cooperating with the delivery portion of said conveyor and movable into and out of operative relation thereto, means for moving the said devices into operative relation to the conveyor while the latter is at rest, a supplemental conveyor adapted to receive the bottles removed from the first mentioned conveyor, a turn table in operative relation to the delivery portion of the last mentioned conveyor, and means for operating the last mentioned conveyor and the turn table intermittently.

14. In an apparatus of the character described, the combination, with bottle-treating means, of a conveyor extending in operative relation to said means, means for moving the conveyor intermittently, a bottle charging conveyor cooperating with the receiving portion of the conveyor and movable into and out of operative relation thereto, a bottle removing device cooperating with the delivery portion of said conveyor and movable into and out of operative relation thereto, means for moving the said devices into operative relation to the conveyor while the latter is at rest, a supplemental conveyor adapted to receive the bottles removed from the first mentioned conveyor, a guard device adapted to be moved into and out of operative relation to the last mentioned conveyor, a turn table in operative relation to the delivery end of the last mentioned conveyor, means for moving the last mentioned conveyor and turn table intermittently whereby said conveyor and turn table will be at rest while the bottles are being delivered to the last mentioned conveyor, and connections whereby the guard device will be in operative relation to the last mentioned conveyor during the movement of said conveyor.

15. In an apparatus of the character described, the combination, with bottle-treating means, of a conveyor extending in operative relation to said means, means for moving said conveyor intermittently, a bottle charging device movable into and out of operative relation to the receiving portion of said conveyor, connections whereby said device will be brought into operative relation to the conveyor when the latter is at rest, a supplemental conveyor adjacent to the delivery portion of the first mentioned conveyor, means for moving the same intermittently, a bottle removing device interposed between the last mentioned conveyor and the delivery portion of the first mentioned conveyor and movable therebetween to remove bottles from the first mentioned conveyor and deliver them onto the last mentioned conveyor, driving connections whereby said bottle removing device will remove the bottles from the first mentioned conveyor while said conveyor is at rest and deliver them to the supplemental conveyor while said supplemental conveyor is at rest, a movable guard device interposed between the bottle removing device and the supplemental conveyor and adapted to be moved into operative relation to the supplemental conveyor, to retain bottles on said conveyor during the movement of the same, and connections whereby said guard device will be moved into operative relation to said supplemental conveyor while the bottle removing device is out of operative relation to said supplemental conveyor.

16. In an apparatus of the character described, the combination, with bottle-treating means, of a conveyor extending in operative relation to said means, means for moving said conveyor intermittently, a bottle charging device movable into and out of operative relation to the receiving portion of said conveyor, connections whereby said device will be brought into operative relation to the conveyor when the latter is at rest, a supplemental conveyor adjacent to the delivery portion of the first mentioned conveyor, means for moving the same intermittently, a bottle removing device interposed between the last mentioned conveyor and the delivery portion of the first mentioned conveyor and movable therebetween to remove bottles from the first mentioned conveyor and deliver them onto the last mentioned conveyor, and driving connections whereby said bottle removing device will remove the bottles from the first mentioned conveyor while said conveyor is at rest and deliver them to the supplemental conveyor while said supplemental conveyor is at rest.

17. The combination, with bottle-treating means, of a bottle conveyor, a pair of reciprocable rods for driving the conveyor intermittently thereby to bring the bottles thereon in operative relation to said bottle-treating means, a rock shaft, a bottle charging rack connected to said rock shaft, a pair of arms projecting from said rock shaft on opposite sides of the conveyor, links connected to said arms, and a pair of rock arms pivoted intermediate their ends and each connected at one end to a link with its other end arranged to be engaged by a rod.

18. The combination, with bottle-treating means, of a bottle conveyor, a reciprocable device for driving the conveyor intermittently thereby to bring the bottles thereon in operative relation to said bottle-treating means, a rock shaft, a bottle charging rack connected to said rock shaft, and means operated by the said device for rocking said shaft.

19. In an apparatus for treating bottles, the combination, with bottle-treating means extending transversely of such apparatus, of a conveyor having transverse series of bottle supports and means for moving the conveyor intermittently to bring the bottles on said supports in operative relation to said bottle-treating means, a bottle charging rack comprising a transverse series of seats or compartments for the sides of the bottles and a foot board or shelf for the bottoms of the bottles, and means for moving said rack into operative relation to the conveyor while the latter is at rest to deliver the bottles neck downward onto the transverse series of supports.

20. In an apparatus for treating bottles, the combination, with bottle-treating means, of a bottle carrier and means for moving the same intermittently to bring the bottles thereon in operative relation to said bottle-treating means, a take-off device adapted to remove the bottles successively from said carrier, a delivery device movable toward and from the take-off device and in opposite phase thereto, a shaft, connections between said shaft and the take-off device for moving the same, connections between said shaft and the delivery device for moving the same, said connections including means for cushioning the movement of each of said devices in one direction, a guard rail arranged to be operated by the delivery device, and a cushioning device connected with said guard rail whereby the delivery device is cushioned in its movement in the opposite direction from that which has been cushioned by such driving connection.

21. In an apparatus of the character described, the combination, with bottle-treating means, of a bottle carrier and means for moving the same intermittently to bring the bottles thereon in operative relation to said bottle-treating means, a take-off device adapted to remove the bottles successively from said carrier, a delivery device adapted to receive the bottles from the take-off device and deliver the same to another point, means for driving both of said devices in opposite phase, said means comprising connections for positively moving one of said devices in both directions and the other device in one direction, and yielding means for moving the last mentioned device in a direction opposite to that imparted thereto by such operatively moving means.

22. In an apparatus for treating bottles, the combination, with bottle-treating means, of a bottle carrier and means for moving the same intermittently to bring the bottles thereon in operative relation to said bottle-treating means, a stop located adjacent to the path of travel of said carrier, a take-off device adapted to remove the bottles successively from the carrier, means for moving said take-off device toward and from said carrier and the stop, a delivery device cooperating with the take-off device, means for moving the delivery device in opposite phase to the take-off device thereby to receive bottles from the take-off device and deliver the same, and means whereby movements of each of said devices will be cushioned.

23. In an apparatus for treating bottles, the combination, with bottle-treating means, of a bottle carrier and means for moving the same intermittently to bring the bottles thereon in operative relation to said bottle-treating means, a take-off device adapted to remove the bottles successively from said carrier, means for moving said take-off device toward and from said carrier, a delivery device cooperating with the take-off device, means for moving the delivery device in opposite phase to the take-off device, and means whereby movements of each of said devices will be cushioned.

24. In an apparatus for treating bottles, the combination, with bottle-treating means extending transversely of such apparatus, of an intermittently movable conveyor having transverse series of seats for bottles and adapted by its movement to bring the bottles on such seats in operative relation to said bottle-treating means, a take-off rack adapted to remove each transverse series of bottles in succession from the conveyor, a rock shaft for moving the rack toward and from the conveyor, a crank shaft for rocking the rock shaft, an arm loose upon the rock shaft, a cam on the crank shaft for rocking said arm, a delivery rack, a rock shaft to which said delivery rack is connected, a link connected with the opposite end of said arm and to the delivery rack, a shaft on which said rack is pivoted, a rod extending from the connection between the link and the arm, a bracket through which said rod extends, and a spring surrounding the rod and bearing against an abutment on said rod and against said bracket.

25. In an apparatus of the character described, the combination with bottle-treating means extending transversely of such apparatus, of a conveyor having transverse series of bottle supports thereon and means for moving the conveyor intermittently to bring the bottles on said supports in operative relation to said bottle-treating means, a take-off rack, means for moving the same toward and from the conveyor thereby to remove successively the transverse series of bottles from the supports thereon, a delivery rack, connections whereby the movement of the take-off rack away from the conveyor will bring the delivery rack in receiving position with respect to the take-off rack, and means whereby the movement of the take-off rack toward the conveyor will move the delivery rack to its delivery position.

26. In an apparatus for treating bottles, the combination, with bottle-treating means, of an intermittently movable carrier having seats for bottles and adapted by its movement to bring the bottles on such seats in operative relation to said bottle-treating means, and a stop located adjacent to the path of travel of said carrier, a take-off device adapted to remove bottles successively from said carrier, a constantly driven shaft, and connections between said shaft and the take-off device for moving the same toward and from the carrier, said connections including a lost-motion device whereby the take-off device is permitted to dwell in bottle-receiving position against said stop.

27. In an apparatus for treating bottles, the combination, with bottle-treating means, of a bottle carrier and means for moving the same intermittently to bring the bottles thereon in operative relation to said bottle-treating means, a stop located adjacent to the path of travel of said carrier, a take-off device adapted to remove the bottles successively from said carrier, means for moving said take-off device toward and from said carrier and the stop, said means comprising a constantly rotating shaft, and connections between said shaft and said take-off device for so moving the same toward and from the stop, said connections including a lost-motion connection and a cushioning device whereby the take-off device is given a dwell when brought against said stop as well as at the end of its movement away from said stop.

28. The combination, with bottle-treating means, of a conveyor having transverse series of supports each adapted to receive the mouth and a part of the neck of a bottle and means for moving said conveyor intermittently to bring the bottles on said supports in operative relation to said bottle-treating means, a take-off rack movable toward and from the discharge portion of said conveyor, said rack having a transverse series of seats corresponding in number and position to the supports in each transverse series of the conveyor and having a notched projection adapted to receive the neck portions of the bottles above the seats on the conveyor.

29. In an apparatus for treating bottles, the combination, with bottle-treating means, of a bottle carrier and means for moving the same intermittently to bring the bottles thereon in operative relation to said bottle-treating means, a stop located adjacent to the path of travel of said carrier, a take-off device adapted to remove the bottles successively from said carrier, means for moving said take-off device toward and from said carrier and the stop, and means for cushioning said take-off device as it approaches the end of its movement toward the stop.

30. In an apparatus for treating bottles, the combination, with bottle-treating means, of a bottle carrier, and means for moving the same intermittently to bring the bottles thereon in operative relation to said bottle-treating means, a take-off device adapted to remove the bottles successively from said carrier, means for moving said take-off device toward and from said carrier and means whereby movements of said device will be cushioned.

31. In an apparatus for treating bottles, the combination, with bottle-treating means extending transversely of such apparatus, of an intermittently movable conveyor having a transverse series of seats for bottles and adapted to bring the bottles on said seats in operative relation to said bottle-treating means, a take-off rack adapted to remove each transverse series of bottles in succession from the conveyor, a rock shaft for moving the rack toward and from the conveyor, a crank shaft, a lost-motion yielding connection between the crank shaft and the rock shaft, and a stop device adjacent the conveyor for limiting the movement of the rack toward said conveyor.

32. In an apparatus for treating bottles, the combination, with bottle-treating means, of a bottle carrier, means for moving said carrier to bring the bottles thereon in operative relation to said bottle-treating means, a delivery device cooperating with said carrier, means for moving said device into bottle receiving and bottle delivering positions, and means whereby the movements of said delivery device will be cushioned.

33. In an apparatus for treating bottles, the combination, with bottle-treating means, of a bottle carrier, means for moving said carrier to bring the bottles thereon in operative relation to said bottle-treating means, a delivery device cooperating with said carrier, means for moving said device into bottle receiving and bottle delivering positions, and means whereby the movement of said delivery device will be cushioned as it approaches the carrier.

34. A take-off rack for bottle treating apparatus having a series of seats for the bodies of bottles and a shelf at one end of said seats, said shelf having at one end of each seat a notch adapted to receive the neck portion of a bottle, and means whereby said rack may be moved to elevate said shelf.

35. A delivery rack for bottle treating apparatus having a movable carrier, said rack comprising a support and partitions extending from said supports providing therebetween seats or compartments wherein bottles may rest on their sides, said compartments being open at both ends and means for moving said rack to incline the seats or compartments thereof whereby the bottles within said seats or compartments may be discharged from said rack.

In testimony whereof, we hereunto affix our signatures.

CHARLES H. LOEW.
JOHN R. GRUETTER.